US008950498B2

(12) United States Patent
Parsinejad et al.

(10) Patent No.: US 8,950,498 B2
(45) Date of Patent: Feb. 10, 2015

(54) METHODS, APPARATUS AND SYSTEMS FOR CONVEYING FLUIDS

(71) Applicants: Farzan Parsinejad, Houston, TX (US); Antonio Carlos Falcao Critsinelis, Kingwood, TX (US); Sid A. Mebarkia, Sugarland, TX (US); Christopher Allen Kassner, Houston, TX (US); Brooks Gerard Johnson, Katy, TX (US)

(72) Inventors: Farzan Parsinejad, Houston, TX (US); Antonio Carlos Falcao Critsinelis, Kingwood, TX (US); Sid A. Mebarkia, Sugarland, TX (US); Christopher Allen Kassner, Houston, TX (US); Brooks Gerard Johnson, Katy, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 115 days.

(21) Appl. No.: 13/738,787

(22) Filed: Jan. 10, 2013

(65) Prior Publication Data
US 2014/0193205 A1 Jul. 10, 2014

(51) Int. Cl.
E21B 17/01 (2006.01)
E21B 43/01 (2006.01)
F17D 1/08 (2006.01)
F16L 1/16 (2006.01)
F16L 55/46 (2006.01)

(52) U.S. Cl.
CPC ... F17D 1/08 (2013.01); F16L 1/16 (2013.01); F16L 55/46 (2013.01)
USPC ............ 166/344; 166/345; 166/346; 166/367

(58) Field of Classification Search
CPC ........ E21B 17/01; E21B 17/085; E21B 43/01
USPC .............. 166/344, 345, 346, 367; 137/15.07; 285/131.1, 132.1; 405/169, 224.2, 405/224.3
See application file for complete search history.

(56) References Cited

U.S. PATENT DOCUMENTS

| | | | | | |
|---|---|---|---|---|---|
| 3,495,380 | A | * | 2/1970 | Goldman et al. | 95/153 |
| 4,528,041 | A | * | 7/1985 | Rickey et al. | 134/8 |
| 4,574,830 | A | * | 3/1986 | Rickey et al. | 137/242 |
| 4,705,114 | A | * | 11/1987 | Schroeder et al. | 166/357 |
| 5,267,616 | A | * | 12/1993 | Silva et al. | 166/311 |
| 5,435,338 | A | * | 7/1995 | Da Silva et al. | 137/242 |
| 5,437,302 | A | * | 8/1995 | Da Silva et al. | 137/242 |
| 5,857,715 | A | * | 1/1999 | Gray et al. | 285/131.1 |
| 5,967,699 | A | | 10/1999 | Knapp et al. | |
| 6,142,708 | A | * | 11/2000 | Tarlton et al. | 405/170 |
| 6,336,238 | B1 | * | 1/2002 | Tarlton | 15/3.5 |
| 6,443,240 | B1 | * | 9/2002 | Scott | 175/7 |
| 7,328,475 | B2 | | 2/2008 | Smith et al. | |
| 7,426,963 | B2 | * | 9/2008 | O'Neill | 166/365 |
| 7,475,915 | B2 | * | 1/2009 | Cafaro | 285/131.1 |
| 7,490,671 | B2 | * | 2/2009 | Gramme et al. | 166/357 |
| 7,516,794 | B2 | * | 4/2009 | Gramme et al. | 166/357 |

(Continued)

FOREIGN PATENT DOCUMENTS

WO WO2011098517 8/2011

Primary Examiner — Matthew Buck
(74) Attorney, Agent, or Firm — Karen R. DiDomenicis

(57) ABSTRACT

Disclosed are pipeline systems, methods and apparatus for handling fluids in offshore oil and gas production. The systems disclosed allow subsea functional lines having diameters which differ by more than 2 standard API 5L pipeline diameters to be placed in fluid communication in such a way that the systems are piggable. Pipeline connection terminations are installed to facilitate connection of such functional lines. Such systems offer solutions to problems related to installing subsea pipeline in rough terrain, over subsea canyons and subsea scarps, installing marine risers, and long tiebacks.

20 Claims, 15 Drawing Sheets

(56) References Cited

U.S. PATENT DOCUMENTS

| | | | |
|---|---|---|---|
| 8,151,394 B2* | 4/2012 | Morris et al. | 15/3.51 |
| 8,469,101 B2* | 6/2013 | Fowler et al. | 166/338 |
| 2005/0284504 A1 | 12/2005 | Kinnari et al. | |
| 2009/0223672 A1* | 9/2009 | Naik | 166/344 |
| 2009/0260695 A1* | 10/2009 | France et al. | 137/318 |
| 2010/0065140 A1* | 3/2010 | Joynson et al. | 137/625.44 |
| 2011/0127029 A1* | 6/2011 | Ganelin et al. | 166/86.2 |
| 2012/0090414 A1* | 4/2012 | Kearns et al. | 73/865.8 |

* cited by examiner

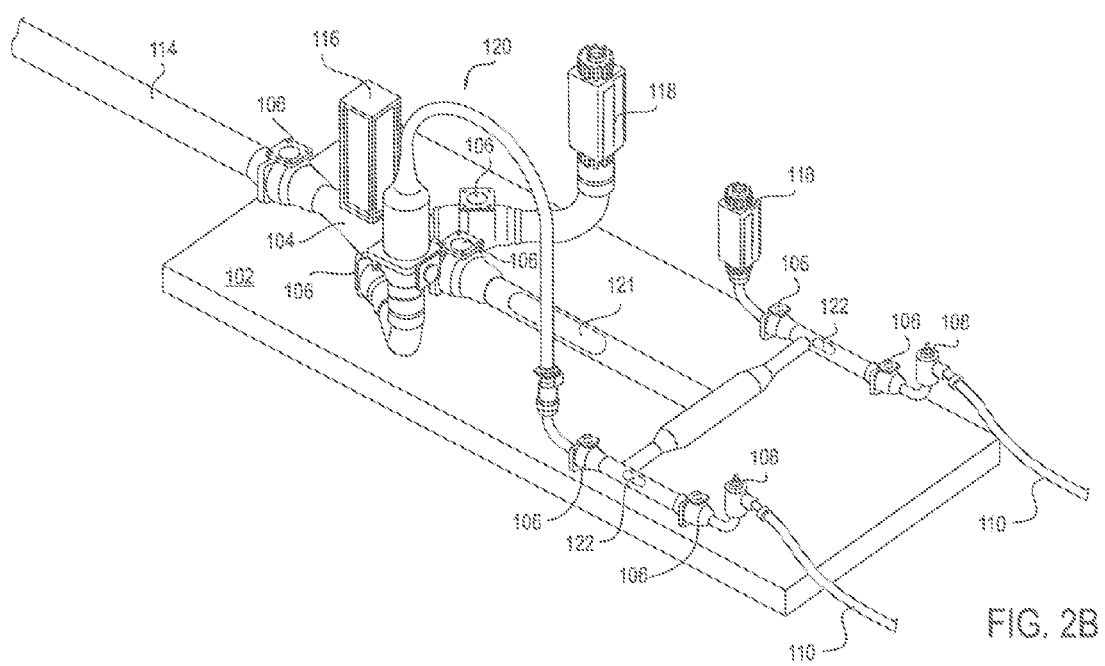

METHODS, APPARATUS AND SYSTEMS FOR CONVEYING FLUIDS

FIELD

The present disclosure relates to systems, methods and apparatus for conveying fluids in subsea functional lines and/or risers. The present disclosure further relates to methods of maintaining such systems.

BACKGROUND

As subsea hydrocarbon production systems have evolved over time, certain challenges have become more problematic. One challenge is that subsea pipeline systems now cover greater areas, therefore the pipelines must traverse greater distances. Pipeline system designers would like to have greater flexibility to utilize various sizes and types of subsea pipeline, particularly as systems become larger and more complex. Another challenge is that as pipeline is laid in deeper and deeper water, the weight of the pipeline can create too much tension to safely install. Another challenge is that certain subsea production fields necessitate subsea pipeline crossing difficult geographical formations, including canyons, scarps and rough terrain. In these situations, it would frequently be desirable to utilize a flexible and/or lighter weight pipe or conduit for at least a portion of the pipeline system.

A consideration which often limits the pipeline system designer's ability to design pipeline systems adapted to such challenges is the piggability of the lines in the systems. It would be desirable to have the ability to provide subsea pipeline systems including transitions between various types of pipe as well as various pipe diameters; however such systems are not piggable with current technology. It would be desirable to provide such systems while retaining the ability to effectively pig the lines of the systems.

SUMMARY

In one aspect, a system for conveying fluids is provided which includes at least one riser having a riser diameter attached to an offshore production platform for conveying fluid to the production platform and at least one functional line located on the seabed having a functional line diameter in fluid communication with the at least one riser for conveying fluid to the at least one riser. The functional line diameter and the riser diameter differ by more than 2 standard API 5L pipeline diameters.

In another aspect, a system for conveying fluids is provided which includes a subsea functional line including a first functional line and a second functional line in fluid communication with one another. The diameters of the first and second functional lines differ by more than 2 standard API 5L pipeline diameters.

In another aspect, a method for maintaining either of the above systems is provided which includes pigging the system.

In another aspect, a wye apparatus including a junction of at least three sections of functional line is provided wherein the diameters of two of the at least three sections of functional line differ by more than 2 standard API 5L pipeline diameters.

In yet another aspect, a pipeline crossing termination is provided which includes a subsea structure capable of connecting to a first functional line and a second functional line or to a functional line and a riser such that the first functional line and the second functional line or the functional line and the riser are placed in fluid communication with one another. A pig launcher can be attached to the subsea structure such that a pig can be launched into the system of the first functional line and the second functional line or of the functional line and the riser. The diameters of the first and second functional lines or of the functional line and the riser differ by more than 2 standard API 5L pipeline diameters.

DESCRIPTION OF THE DRAWINGS

These and other objects, features and advantages of the present invention will become better understood with reference to the following description, appended claims and accompanying drawings where:

FIGS. 2A and 2B are perspective views illustrating a pipeline connection terminal according to another exemplary embodiment wherein the pipeline connection terminal includes a pig launcher.

DETAILED DESCRIPTION

Figure 1:
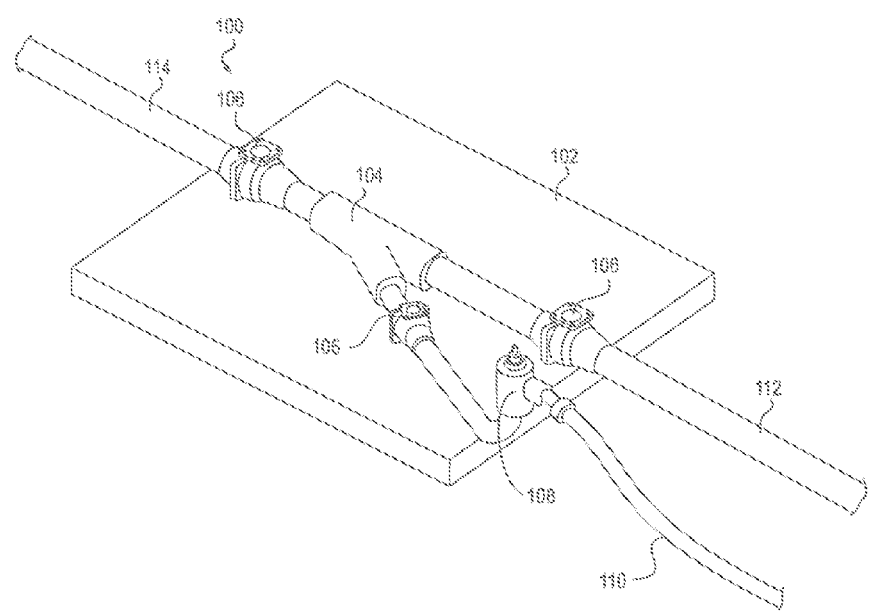
FIG. 1 is a perspective view illustrating a pipeline connection terminal according to one exemplary embodiment wherein the pipeline connection terminal includes a wye.

Embodiments are described hereinafter in which conduits for conveying fluids of differing conduit type and/or large diameter differences are utilized in a subsea production system in such a way that the conduits are in fluid communication with one another and the system is piggable.

As used herein, the terms "pipeline," "pipe," "functional line," "line," and "conduit" may be used interchangeably to refer to conduits for conveying fluids which may be utilized in subsea hydrocarbon production systems. The term "riser" refers to a conduit for conveying fluids extending from the seabed to a surface location, such as a platform or vessel.

In some embodiments, a system for conveying fluids is provided which includes at least one riser attached to an offshore production platform for conveying fluid to the production platform and at least one functional line located on the seabed in fluid communication with the at least one riser for conveying fluid to the at least one riser. In some embodiments, the riser can have a length of at least 10 m, even of 10 m to 5000 m. The functional line on the seabed can be a subsea pipeline for conveying oil and gas production fluids.

Alternatively, the functional line on the seabed can be used to convey other fluids known to be useful in the production of oil and gas. For instance, such functional lines can be selected from oil recovery gas lines, gas lift lines, water lines, well service lines, well kill lines, scale squeeze lines, methanol lines, MEG lines and lines for tertiary recovery fluid, as will be familiar to those skilled in the art.

The riser and the functional line can be different types of pipe. For instance, the functional line can be a rigid pipe while the riser can be an engineered pipe. The engineered pipe can be bonded flexible pipe, unbonded flexible pipe or multilayered composite pipe.

Advantageously, the functional line diameter and the riser diameter differ by more than 2 standard API 5L pipeline diameters. More specifically, the functional line diameter can be, for example, at least 10.2 cm, even from 10.2 cm to 102 cm. The riser diameter can be, for example, at least 5.1 cm, even from 5.1 cm to 91.4 cm. Thus, systems including a combination such as, for example, a riser having a nominal pipe size (NPS) of 20 in (outer diameter of 50.8 cm) in fluid communication with a functional line having a NPS of 40 in (outer diameter of 101.6 cm) can be provided by the present disclosure. The present disclosure also provides other combinations, including, as nonlimiting examples, a riser having a NPS of 16 in (outer diameter of 40.6 cm) in fluid communication with a functional line having a NPS of 3½ in (outer diameter of 8.89 cm); and a riser having a NPS of 6⅝ in (outer diameter of 16.8 cm) in fluid communication with a functional line having a NPS of 14 in (outer diameter of 35.6 cm).

A pipeline crossing termination can be located on the seabed between the functional line and the riser. The term "pipeline crossing termination" as used herein refers to a subsea structure such as a manifold capable of connecting to multiple lines and/or risers such that the lines and/or risers are placed in fluid communication with one another. In some embodiments, a pipeline crossing termination is located between the at least one riser and the at least one functional line on the seabed. The pipeline crossing termination allows lines and/or risers of different types and diameters differing by more than 2 standard API 5L pipeline diameters to be connected.

In some embodiments, a system for conveying fluids is provided which includes at least two functional lines in fluid communication with one another, i.e., at least a first functional line located on the seabed and a second functional line located on the seabed. The first and second functional lines can be different types of pipe selected from rigid pipe and engineered pipe. The diameters of the first and second functional lines differ by more than 2 standard API 5L pipeline diameters. A pipeline crossing termination, as described above, can be located on the seabed between the first and second functional lines.

FIG. 1 illustrates a system 100 according to one exemplary embodiment wherein a first functional line 114 is connected to second and third functional lines 112 and 110 via a wye 104. The functional lines 114 and 110 in the embodiment illustrated differ by more than 2 standard API 5L pipeline diameters, where 114 and 112 are rigid pipe and 110 is a flexible pipe. A mudmat 102 supports the wye 104. Also provided are valves 106 and a pipeline connector 108 as appropriate, as would be apparent to one skilled in the art.

In some embodiments, the pipeline crossing termination, connecting either the at least one riser and at least one functional line located on the seabed or the at least first and second functional lines, can further include a subsea pig launcher capable of housing at least one pig and introducing a pig into the system. The pig can travel in any direction and stop at any point through the system. Through pigging the system, the functional line(s) and/or the riser(s) of the system can be maintained. Pigs capable of passing through pipeline systems have a multiple diameters and differing types of pipe are disclosed in co-pending patent application Ser. No. 13/738,740, the contents of which are incorporated herein by reference.

Figure 2A:
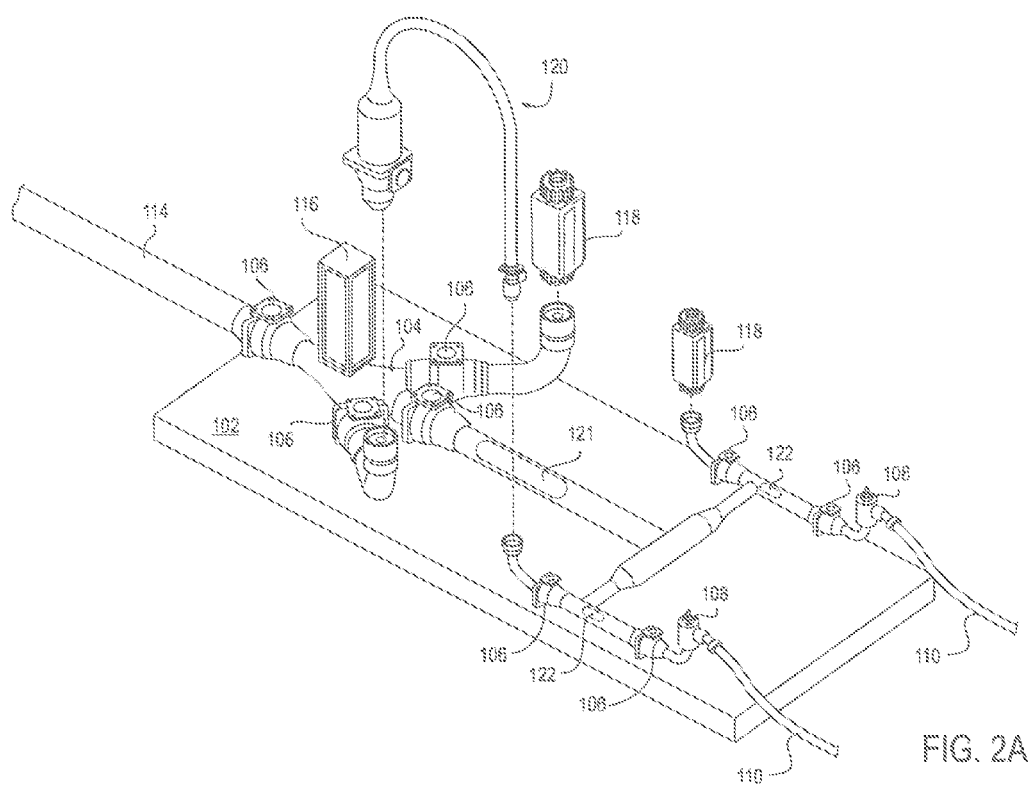

In one embodiment, FIGS. 2A and 2B illustrate a pipeline crossing termination connecting a large diameter pipeline 114 with two smaller diameter pipelines 110. FIG. 2A is an exploded view, and 2B illustrates a system when pig launcher/receiver 120 is connected to the pipeline system so that a pig 121 can be inserted or removed from the system. Pig launcher/receiver 120 is oriented vertically in this embodiment. An ROV interface 116 can be provided to assist with pig launching and receiving operations. In the system illustrated, wye 104 includes four pipeline branches. Coiled tubing interfaces 118 can be provided to allow the insertion of coiled tubing into the pipeline.

In some embodiments, to be described hereinafter, the pig 121 can further include one or more smaller pigs 122 contained therein which can be released into the smaller diameter pipelines 110.

Figure 3A:
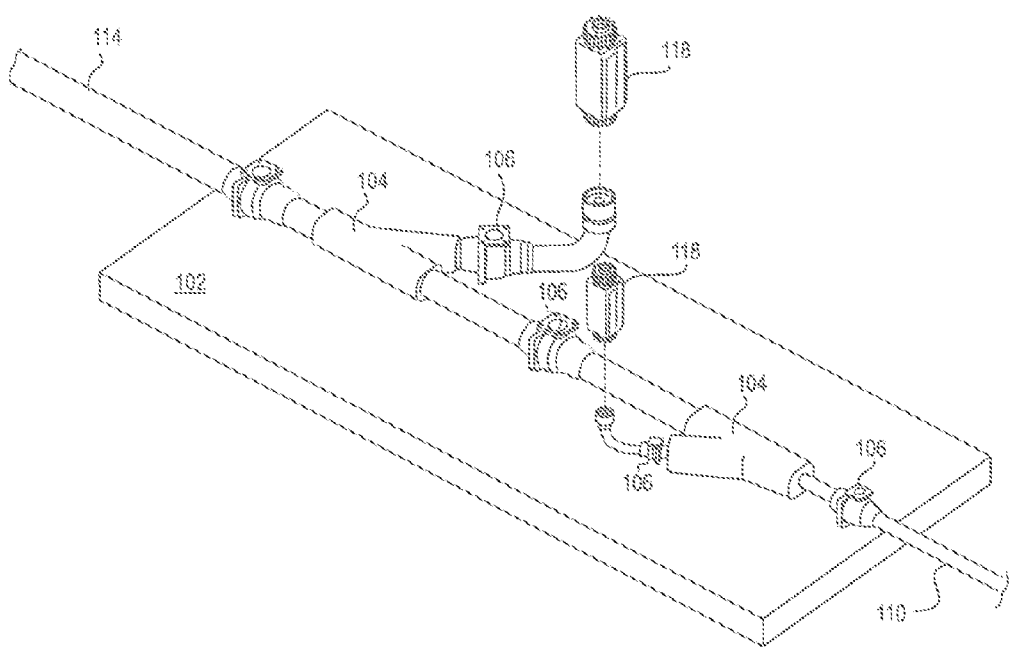
FIGS. 3A and 3B are perspective views illustrating a pipeline connection terminal according to another exemplary embodiment wherein the pipeline connection terminal includes coiled tubing interfaces.
Figure 3B:
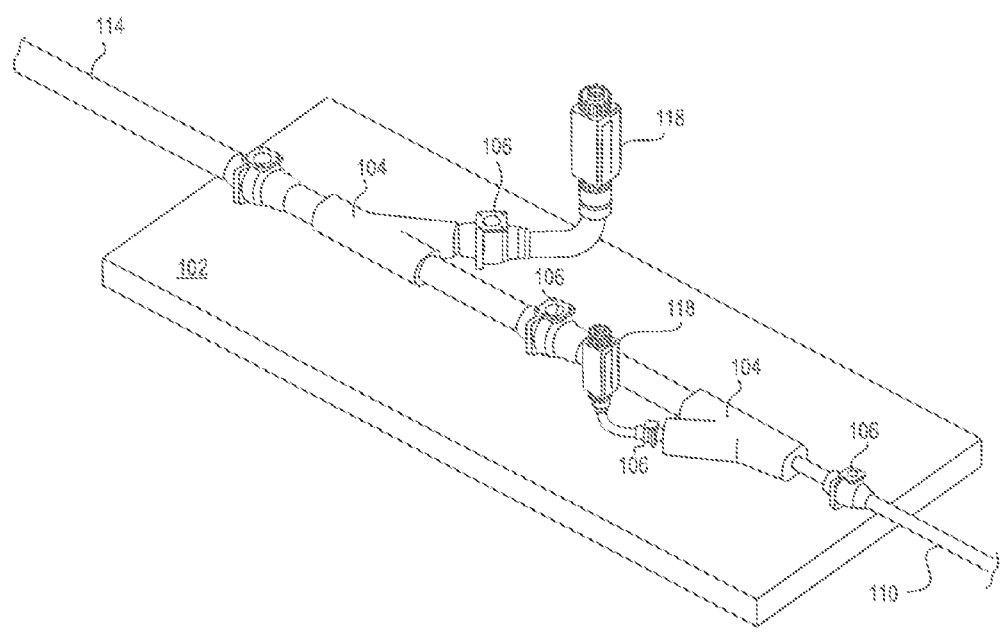

FIGS. 3A and 3B illustrate a pipeline crossing termination connecting a single large diameter pipeline 114 with a single smaller diameter pipeline 110. In the particular embodiment illustrated, two wyes 104 are used. Two coiled tubing interfaces 118 are also included. FIG. 3A is an exploded view, and 3B illustrates a system in which the coiled tubing interfaces 118 are connected to the pipeline system.

Figure 4:
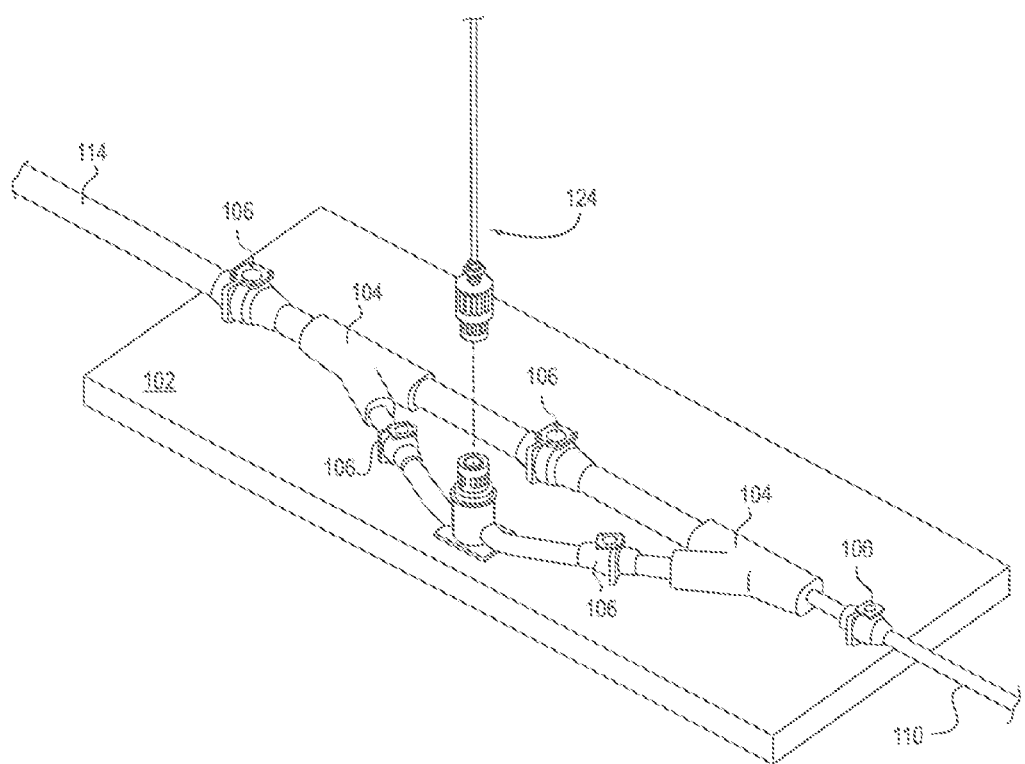
FIG. 4 is a perspective view illustrating a pipeline connection terminal according to another exemplary embodiment in which the pipeline connection terminal includes a booster pump.

FIG. 4 illustrates a system according to one exemplary embodiment in which a single large diameter pipeline 114 is in fluid communication with a single smaller diameter pipeline 110. In this particular embodiment, a booster pump 124 is further provided for pumping fluids conveyed within the functional lines. The pipeline crossing termination can further include any of a number of other known components for use in subsea production systems. For example, it may be convenient to include a gas-liquid separator mounted on the pipeline crossing termination for separating gas and liquid fluids conveyed within the functional lines connected thereto. Other subsea system components as would be apparent to one skilled in the art may also be included.

Figure 5:
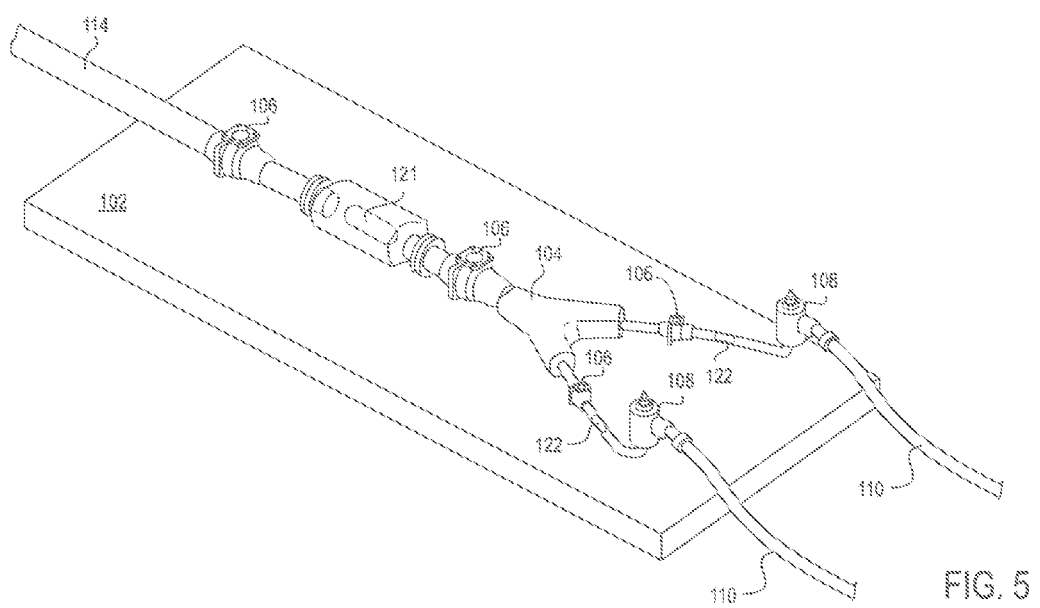
FIG. 5 is a perspective view illustrating a pipeline connection terminal according to another exemplary embodiment wherein the pipeline connection terminal includes a pig launcher.

FIG. 5 illustrates a system according to one exemplary embodiment in which a pig launcher/receiver 120 oriented horizontally is connected to the pipeline system so that a pig 121 can be inserted or removed from the system. Again, as will be described further hereinafter, the pig 121 can further include one or more smaller pigs 122 contained therein which can be released into the smaller diameter pipelines 110.

Figure 6A:
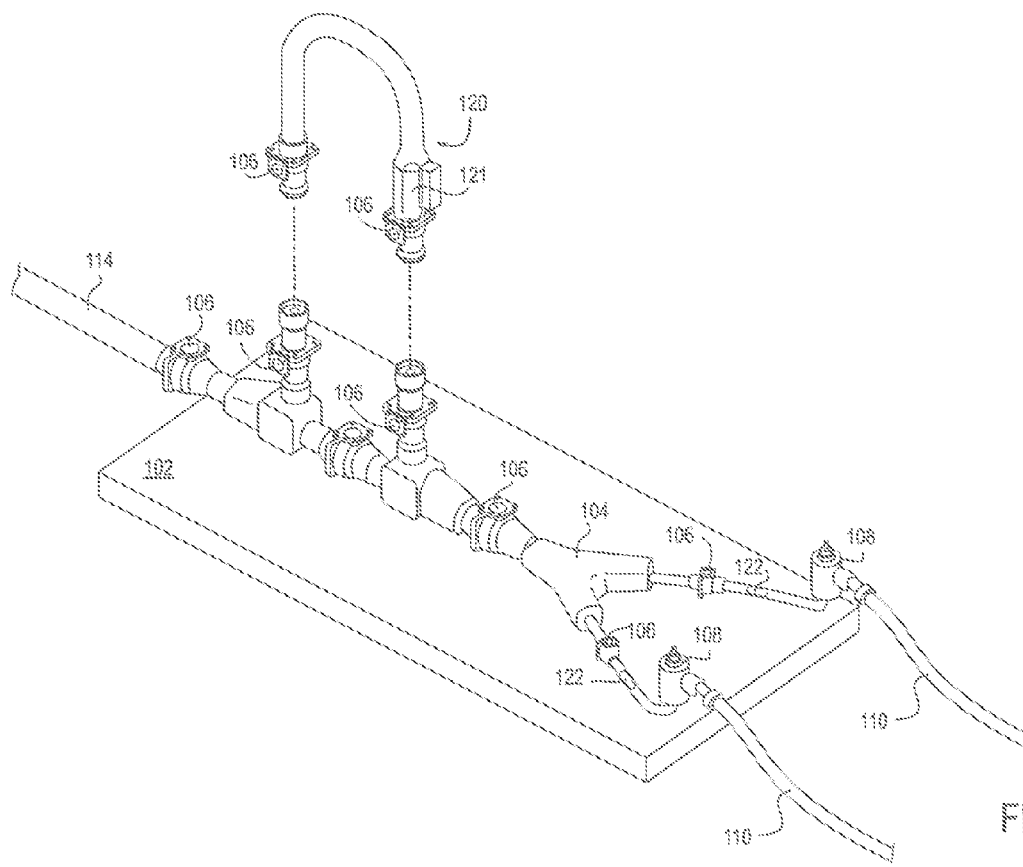
FIGS. 6A and 6B are perspective views illustrating a pipeline connection terminal according to another exemplary embodiment wherein the pipeline connection terminal includes a wye and a pig launcher.
Figure 6B:
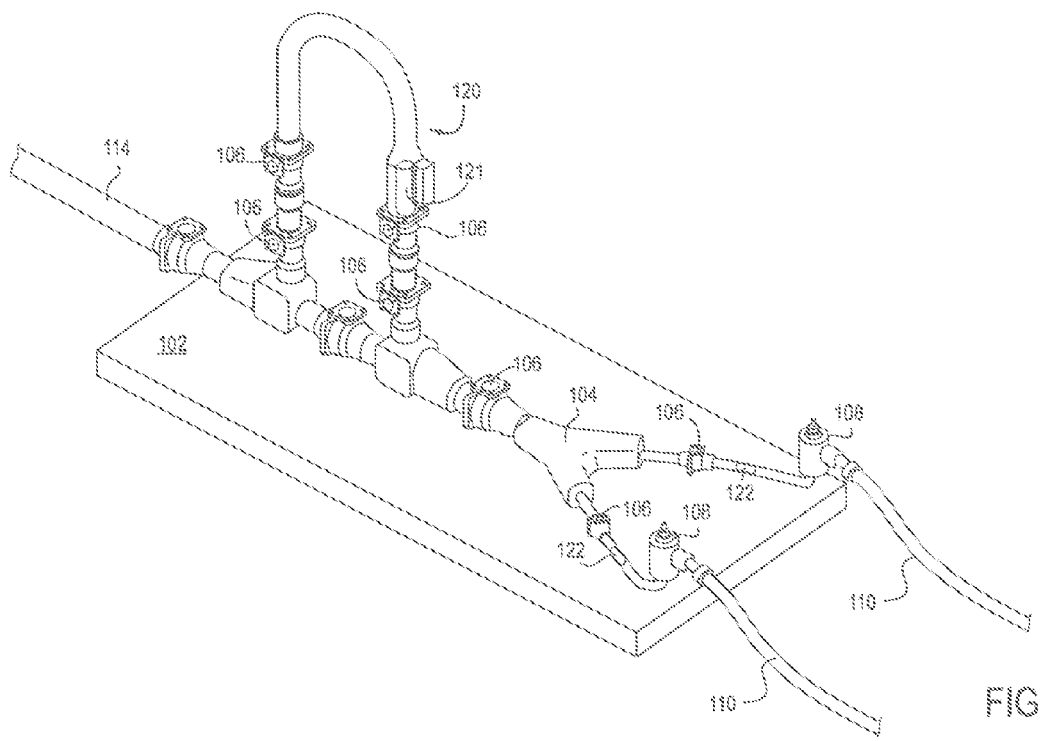

FIGS. 6A (exploded view) and 6B (connected view) illustrate a system according to another exemplary embodiment in which a pig launcher/receiver 120 oriented vertically is connected to the pipeline system so that a pig 121 can be inserted or removed from the system. Again, as will be described further hereinafter, the pig 121 can further include one or more smaller pigs 122 contained therein which can be released into the smaller diameter pipelines 110.

Figure 7A:
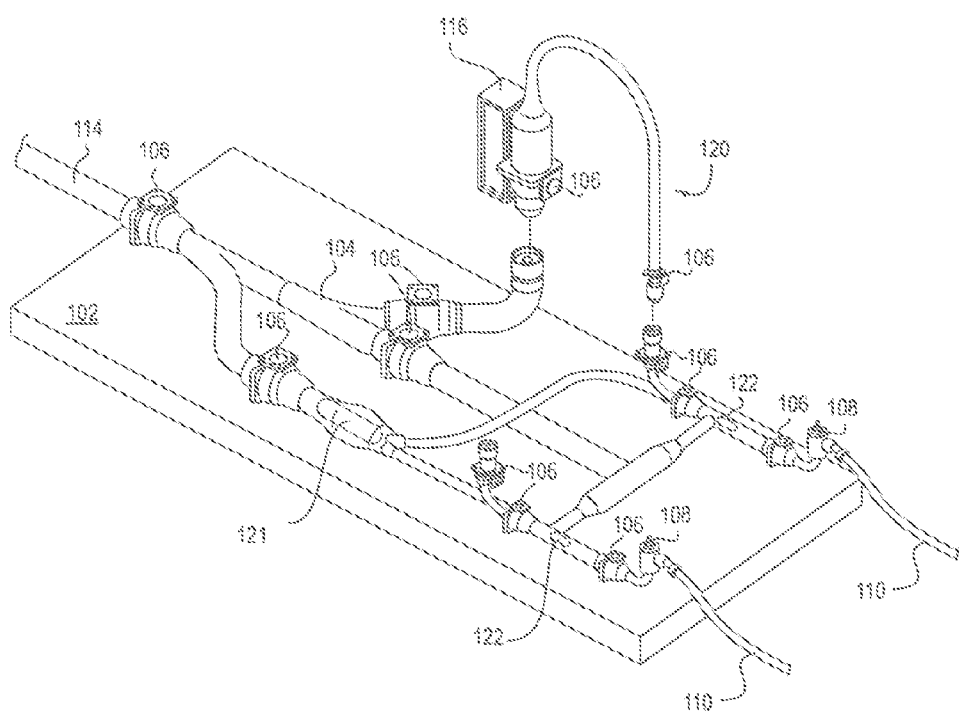
FIGS. 7A and 7B are perspective views illustrating a pipeline connection terminal according to another exemplary embodiment wherein the pipeline connection terminal includes multiple wyes and a pig launcher.
Figure 7B:
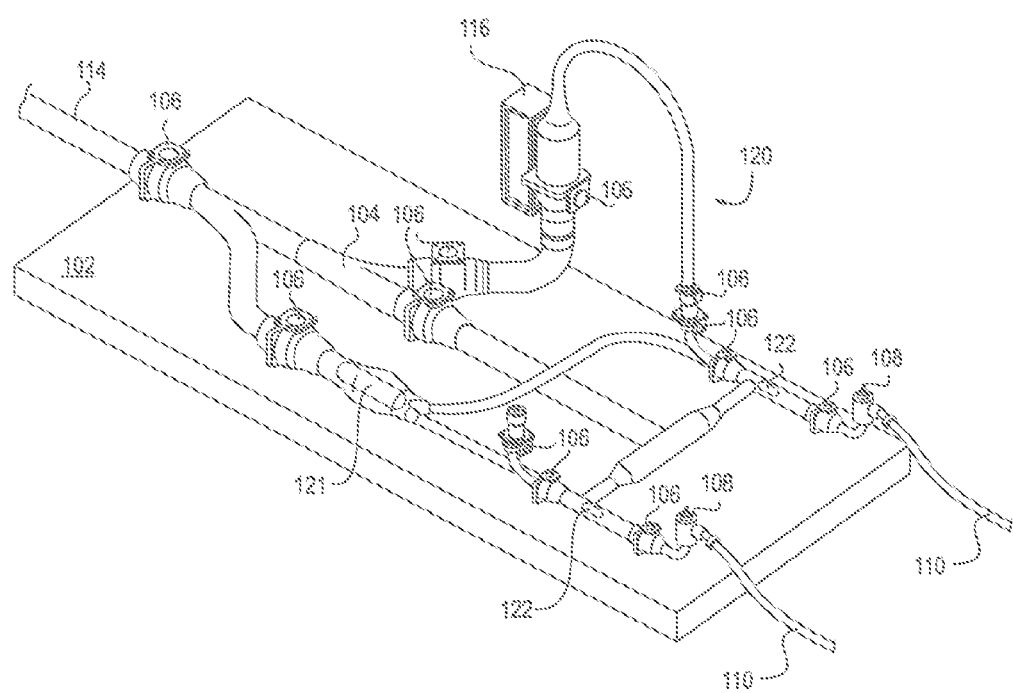

FIGS. 7A (exploded view) and 7B (connected view) illustrate a system according to yet another exemplary embodiment in which a pig launcher/receiver 120 oriented vertically is connected to the pipeline system so that a pig 121 can be inserted or removed from the system. Again, as will be described further hereinafter, the pig 121 can further include one or more smaller pigs 122 contained therein which can be released into the smaller diameter pipelines 110.

In some embodiments, the system can also include a third functional line such that the second functional line is located between the first and third functional lines. For example, the second functional line can cross a section of rough terrain, a subsea scarp or cliff, or a subsea canyon. Each of the first, second and third functional lines can have different diameters, or two of the three functional lines have diameters that differ by more than 2 standard API 5L pipeline diameters.

In some embodiments, the system includes two pipeline sections generally running in parallel with one another. This is particularly advantageous when the tension involved in installing a single large diameter line would be too great, thus prohibiting installation of a single pipeline. The tension can be further reduced by the use of lighter weight flexible conduit(s) in place of conventional rigid pipe.

In some embodiments, the system can include two generally parallel risers connected to the functional line located on the seabed and also connected to the offshore production platform. Again, the two generally parallel risers can be lighter weight flexible pipe such that the stress on the connection with the platform is not excessively high.

In some other embodiments, the system includes two generally parallel functional lines located on the seabed connected to a riser which is attached to an offshore production platform. Such a system can be used for various reasons, including providing flexibility to transport production fluids from multiple sources to a single riser.

The first and second and optional third functional lines can be subsea pipeline conveying oil and gas production fluids. Alternatively, the functional lines can be selected from oil recovery gas lines, gas lift lines, water lines, well service lines, well kill lines, scale squeeze lines, methanol lines, MEG lines and lines for tertiary recovery fluid.

The first and second and optional third functional lines can be different types of pipe, wherein the types of pipe are selected from rigid pipe and engineered pipe. The engineered pipe can be bonded flexible pipe, unbonded flexible pipe or multilayered composite pipe.

The diameters of two of the first and second and optional third functional lines differ by more than 2 standard API 5L pipeline diameters. One of the functional line diameters can be at least 10.2 cm, even from 10.2 cm to 102 cm. Another of the functional line diameters can be at least 5.1 cm, even from 5.1 cm to 91.4 cm. Other combinations of pipeline diameters can be used. Thus, systems including a combination such as, for example, a functional line having a nominal pipe size (NPS) of 40 in (outer diameter of 101.6 cm) in fluid communication with a functional line having a NPS of 20 in (outer diameter of 50.8 cm) can be provided by the present disclosure. The present disclosure also provides other combinations, including, as nonlimiting examples, a functional line having a NPS of 40 in (outer diameter of 101.6 cm) in fluid communication with a functional line having a NPS of 16 in (outer diameter of 40.6 cm); a functional line having a NPS of 3½ in (outer diameter of 8.89 cm) in fluid communication with a functional line having a NPS of 6⅝ in (outer diameter of 16.8 cm); and a functional line having a NPS of 14 in (outer diameter of 35.6 cm) in fluid communication with a functional line having a NPS of 20 in (outer diameter of 50.8 cm).

Figure 8:
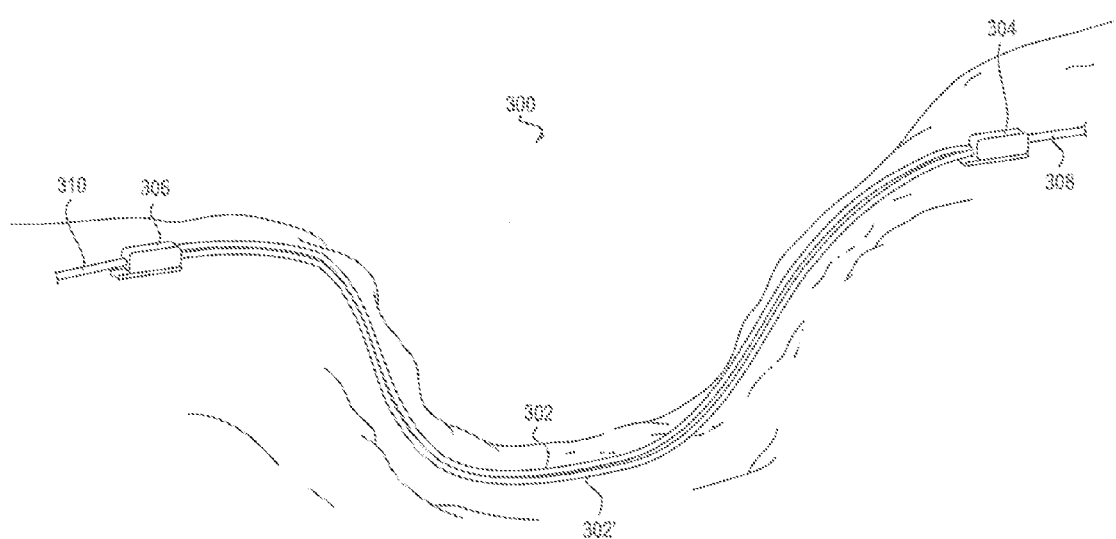
FIGS. 8-11 are illustrations of subsea pipeline systems utilizing pipeline connection terminals according to embodiments disclosed herein.

The present disclosure is particularly useful in certain scenarios. FIG. 8 illustrates a subsea pipeline system 300 in one such scenario, in which pipeline crossing terminations 304 and 306 are installed on the seabed on each side of a subsea canyon. On the higher ground adjacent the canyon on each side, pipelines 308 and 310 can extend away from the c's anyon in either direction. Pipelines 308 and 310 can be larger diameter functional lines, typically rigid pipe, although other types of pipe can also be used in such a system. Extending between pipeline crossing terminations 304 and 306 can be flexible engineered pipe. Illustrated are two generally parallel functional lines 302 and 302' extending across the canyon in parallel.

Figure 9:
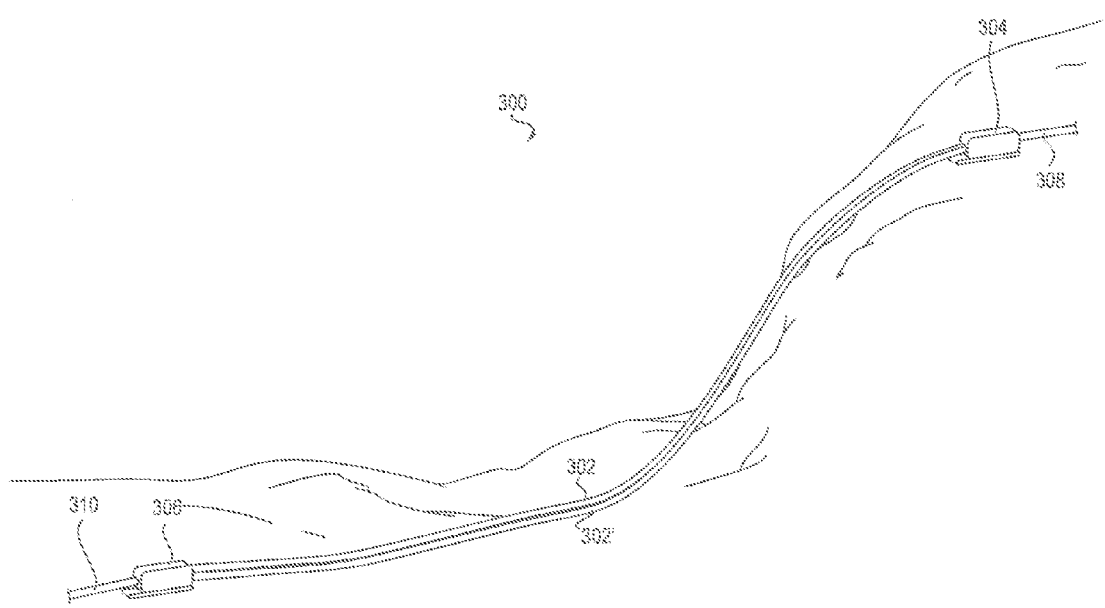

FIG. 9 illustrates a similar scenario, in which pipeline crossing terminations 304 and 306 are installed on the seabed on each side of a subsea scarp or subsea cliff, rather than a canyon as described above.

Figure 10:
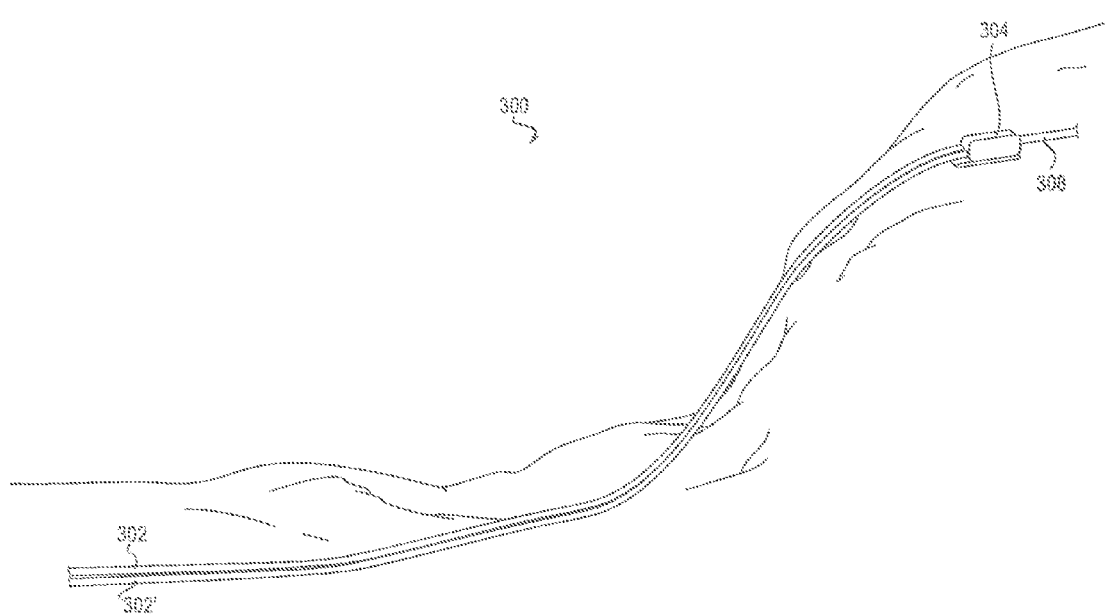

FIG. 10 illustrates another scenario, in which a pipeline crossing termination 304 is installed on the seabed at a shallower water depth, and the two parallel functional lines 302 and 302' extend into progressively deeper water.

Figure 11:
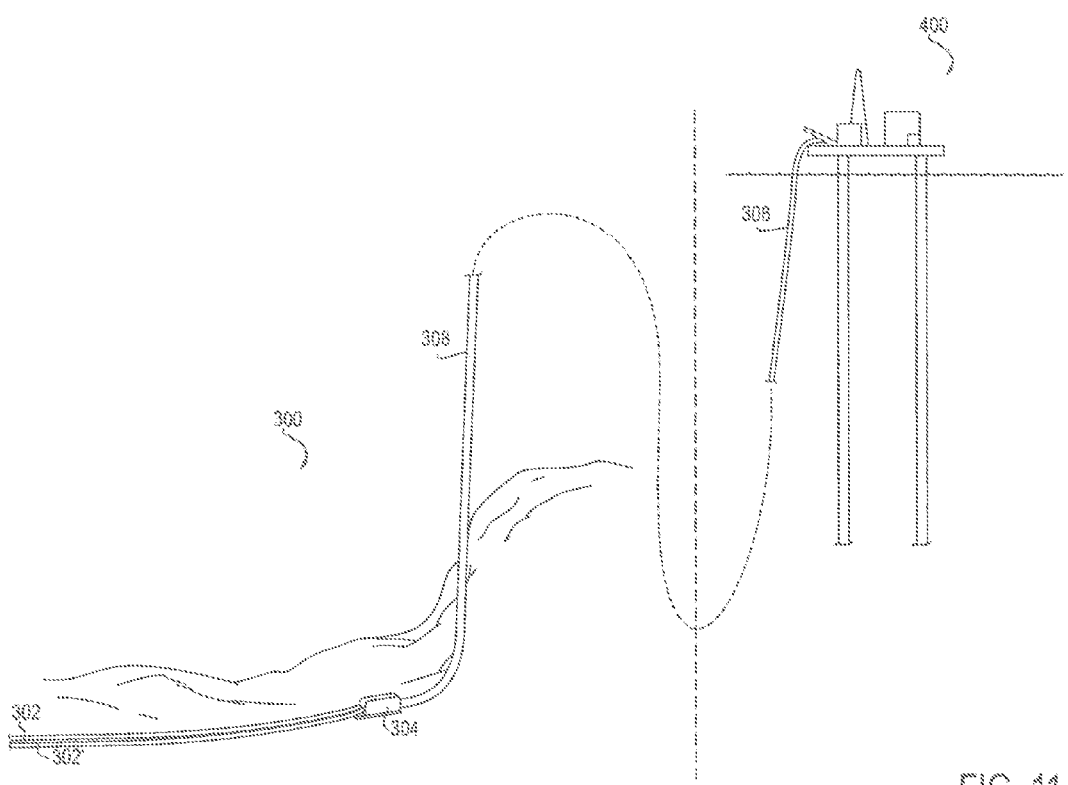

FIG. 11 illustrates another scenario, in which a pipeline crossing termination 304 is installed on the seabed at the base of a marine riser 308. In this embodiment, the pipeline crossing termination 304 acts to connect the two parallel functional lines 302 and 302' on the seabed with the riser 308, which in turn is connected to an offshore production platform 400.

In one embodiment, a novel piggable pipeline wye apparatus, also referred to as a "wye apparatus" or simply a "wye," is provided. The wye apparatus includes a junction of at least three sections of functional line wherein the diameters of two of the at least three sections of functional line differ by more than 2 standard API 5L pipeline diameters. The wye can be mounted on the subsea structure of the pipeline crossing termination. In one embodiment, two of the at least three sections of functional line of the wye are moveable to allow a section of functional line containing a pig to be removed from the flow path.

The pipeline crossing termination may be capable of isolating at least two of the functional lines connected to the pipeline crossing termination from one another, thus enabling fluid flow to be ceased in at least a portion of the pipeline system as may be needed for inspection or repair. This may be accomplished by closing valves on the pipeline crossing termination, for example. Other means will be apparent to those skilled in the art.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:
1. A system for conveying fluids, comprising:
 a. at least one riser having a riser diameter attached to an offshore production platform for conveying fluid to the production platform;
 b. at least one functional line having a functional line diameter in fluid communication and in series with the at least one riser on the seabed for conveying fluid to the at least one riser;
 c. a pipeline crossing termination between the at least one riser and the at least one functional line on the seabed; and d. a subsea pig launcher capable of housing a pig and introducing the pig into the at least one functional line or the at least one riser;

wherein the functional line diameter and the riser diameter differ by more than 2 standard API 5L pipeline diameters; and wherein the pig can travel in any direction and stop at any point through the at least one functional line and the at least one riser.

2. The system of claim 1, wherein the functional line diameter is from 10.2 cm to 102 cm; and the riser diameter is from 5.1 cm to 91.4 cm.

3. The system of claim 1, wherein the functional line is a subsea pipeline conveying oil and gas production fluids.

4. The system of claim 1, wherein the functional line is selected from the group consisting of oil recovery gas lines, gas lift lines, water lines, well service lines, well kill lines, scale squeeze lines, methanol lines, MEG lines, lines for enhanced oil recovery polymers and lines for tertiary recovery fluid.

5. The system of claim 1, wherein the types of pipe used for the riser and the functional line differ from one another, and wherein the types of pipe used for the riser and the functional line are selected from the group consisting of rigid pipe and engineered pipe.

6. The system of claim 5, wherein the engineered pipe is selected from the group consisting of bonded flexible pipe, unbonded flexible pipe, multilayered pipe and single layer composite pipe.

7. The system of claim 1, wherein the riser has a length of 10 m to 5000 m.

8. The system of claim 1, wherein the system comprises two parallel functional lines each having a functional line diameter in fluid communication and in series with the at least one riser on the seabed for conveying fluid to the at least one riser.

9. A system for conveying fluids, comprising:
a. a first subsea functional line;
b. a second subsea functional line in fluid communication and in series with the first subsea functional line;
c. a pipeline crossing termination between the first subsea functional line and the second subsea functional line; and
d. a subsea pig launcher capable of housing a pig and introducing the pig into the first subsea functional line or the second subsea functional line;

wherein the diameters of the first and second subsea functional lines differ by more than 2 standard API 5L pipeline diameters; and wherein the pig can travel in any direction through the first subsea functional line and the second subsea functional line and stop at any point through the first subsea functional line and the second subsea functional line.

10. The system of claim 9, wherein the first subsea functional line diameter is from 10.2 cm to 102 cm; and the second subsea functional line diameter is from 5.1 cm to 91.4 cm.

11. The system of claim 9, further comprising a third subsea functional line in fluid communication and in parallel with the second subsea functional line such that the second and third subsea functional lines are located in series with the first subsea functional lines.

12. The system of claim 9, wherein the second subsea functional line crosses a geographical formation selected from the group consisting of subsea shallow water-to-deep water transitions, subsea scarps and subsea canyons.

13. The system of claim 9, wherein at least one of the first subsea functional line and second subsea functional line comprises two pipeline sections generally running in parallel.

14. A method for maintaining a system for conveying oil and gas production fluids, comprising:
pigging a subsea pipeline comprising at least a first subsea functional line and a second subsea functional line in fluid communication and in series with one another;
wherein the diameters of the first and second subsea functional lines differ by more than 2 standard API 5L pipeline diameters; and
wherein the pig travels through both the first subsea functional line and the second subsea functional line.

15. The method of claim 14, wherein at least one of the first subsea functional line and second subsea functional line comprises two pipeline sections generally running in parallel.

16. A method for maintaining a system for conveying oil and gas production fluids, comprising:
pigging a line including a riser having a riser diameter attached to an offshore production platform for conveying fluid to the production platform and a functional line located on the seabed having a functional line diameter connected to and in series with the riser;
wherein the functional line diameter and the riser diameter differ by more than 2 standard API 5L pipeline diameters; and wherein the pig travels through both the functional line and the riser.

17. The method of claim 16, wherein the line further comprises a second riser connected to the functional line and attached to the offshore production platform;
wherein the functional line diameter and the diameter of the second riser differ by more than 2 standard API 5L pipeline diameters.

18. The method of claim 16, wherein the line further comprises a second functional line located on the seabed connected to the riser;
wherein the diameter of the second functional line and the riser diameter differ by more than 2 standard API 5L pipeline diameters.

19. A system for conveying fluids, comprising:
a. a riser having a riser diameter attached to an offshore production platform for conveying fluid to the production platform;
b. a functional line having a functional line diameter in fluid communication and in series with the riser on the seabed for conveying fluid to the riser wherein the riser diameter and the functional line diameter differ by more than 2 standard API 5L pipeline diameters; and
c. a wye between the riser and the functional line capable of passing a pig from the functional line to the riser;
wherein the pig can travel in any direction and stop at any point through the riser and the functional line.

20. A system for conveying fluids, comprising:
a. a first subsea functional line having a first subsea functional line diameter;
b. a second subsea functional line having a second subsea functional line diameter in fluid communication and in series with the first subsea functional line wherein the first and second subsea functional line diameters differ by more than 2 standard API 5L pipeline diameters; and
c. a wye between the first subsea functional line and the second subsea functional line capable of passing a pig from the first functional line to the second functional line; wherein the pig can travel in any direction and stop at any point through the first and second functional lines.

* * * * *